(12) United States Patent
Li et al.

(10) Patent No.: US 12,449,301 B2
(45) Date of Patent: Oct. 21, 2025

(54) PHOTOELECTRIC DETECTION DEVICE WITH SEALED DESIGN AND UNDISTORTED PHOTOELECTRIC SIGNALS, AND IMPLEMENTATION METHOD THEREOF

(71) Applicant: INSTITUTE OF MICROELECTRONICS, CHINESE ACADEMY OF SCIENCES, Beijing (CN)

(72) Inventors: Jing Li, Beijing (CN); Huijuan Ma, Beijing (CN); Minxia Ding, Beijing (CN); Zhipeng Wu, Beijing (CN); Dan Wang, Beijing (CN)

(73) Assignee: INSTITUTE OF MICROELECTRONICS, CHINESE ACADEMY OF SCIENCES, Beijing (CN)

( * ) Notice: Subject to any disclaimer, the term of this patent is extended or adjusted under 35 U.S.C. 154(b) by 218 days.

(21) Appl. No.: 18/034,050

(22) PCT Filed: Nov. 30, 2020

(86) PCT No.: PCT/CN2020/132619
§ 371 (c)(1),
(2) Date: Apr. 26, 2023

(87) PCT Pub. No.: WO2022/110101
PCT Pub. Date: Jun. 2, 2022

(65) Prior Publication Data
US 2023/0392982 A1  Dec. 7, 2023

(51) Int. Cl.
*G01J 1/44* (2006.01)
*G01J 1/02* (2006.01)

(52) U.S. Cl.
CPC .............. *G01J 1/44* (2013.01); *G01J 1/0219* (2013.01); *G01J 1/0252* (2013.01); *G01J 2001/444* (2013.01); *G01J 2001/448* (2013.01)

(58) Field of Classification Search
CPC .......... G01J 1/44; G01J 1/0219; G01J 1/0252; G01J 2001/444; G01J 2001/448; H04B 10/07
See application file for complete search history.

(56) References Cited

U.S. PATENT DOCUMENTS 11,965,825 B2 * 4/2024 Domnick ........... G01N 21/0332

FOREIGN PATENT DOCUMENTS

| CN | 103412313 A | 11/2013 |
|---|---|---|
| CN | 103744087 A | 4/2014 |

(Continued)

OTHER PUBLICATIONS

International Search Report issued Aug. 19, 2021, by the China National Intellectual Property Administration in corresponding Application No. PCT/CN2020/132619.

(Continued)

*Primary Examiner* — Tony Ko
(74) *Attorney, Agent, or Firm* — Morgan, Lewis & Bockius LLP

(57) ABSTRACT

A photoelectric detection device, including: a vacuum sealed housing, wherein the vacuum sealed housing includes a mounting interface for mounting the photodetector array so as to form a sealed space; the photodetector array has a detection surface facing an outside of the vacuum sealed housing and configured to receive multi-channel measurement optical signals; a photoelectric conversion and synchronous acquisition circuit and a high speed transmission circuit board are placed in the vacuum sealed housing, and the photodetector array is connected to the photoelectric (Continued)

conversion and synchronous acquisition circuit through a signal pin of the photodetector array; the photoelectric conversion and synchronous acquisition circuit is configured to synchronously convert the multi-channel measurement optical signals obtained by the photodetector array into multi-channel digital signals; and the high speed transmission circuit board is configured to perform a serial encoding processing on the converted multi-channel digital signals.

6 Claims, 6 Drawing Sheets

(56) References Cited

FOREIGN PATENT DOCUMENTS

| | | | |
|---|---|---|---|
| CN | 105703828 A | 6/2016 |
| CN | 106248564 A | 12/2016 |
| CN | 110967943 A | 4/2020 |
| CN | 110967944 A | 4/2020 |

OTHER PUBLICATIONS

Office Action dated Jun. 28, 2023 issued in the corresponding Chinese Patent Application No. 202011374353.X. (Note: CN 110967944 A cited in prior IDS).

* cited by examiner (a)  (b)

PHOTOELECTRIC DETECTION DEVICE WITH SEALED DESIGN AND UNDISTORTED PHOTOELECTRIC SIGNALS, AND IMPLEMENTATION METHOD THEREOF

CROSS REFERENCE

This application is a Section 371 National Stage Application of International Application No. PCT/CN2020/132619, filed on Nov. 30, 2020, entitled "PHOTOELECTRIC DETECTION DEVICE WITH SEALED DESIGN AND UNDISTORTED PHOTOELECTRIC SIGNALS, AND IMPLEMENTATION METHOD THEREOF", which is incorporated herein by reference in their entirety.

TECHNICAL FIELD

The present disclosure relates to a field of semiconductor device technology, and in particular to a photoelectric detection device with a sealed design and undistorted photoelectric signals, and an implementation method thereof.

BACKGROUND

In an optical principle-based photoelectric detection sensor, it is necessary to simultaneously acquire multi-channel measurement optical intensity signals by means of a photoelectric detection device, and then the acquired optical signals are measured so as to obtain a desired measurement information. In the semiconductor industry, in fields of electron beam imaging, optical inspection and lithography, the measurement sensor and the photoelectric detection device need to be placed in a vacuum environment in more and more occasions.

When the photoelectric detection device is used in the vacuum environment, a photoelectric conversion array, a PCB board and a cable, etc. in the photoelectric detection device may release a large amount of gas and particles to contaminate the vacuum environment. In order to effectively control and reduce a contamination of the photoelectric detection device to the vacuum environment, a special processing needs to be performed on the photoelectric detection device.

At present, an existing processing method includes sealing the photoelectric detection device in a sealed housing, receiving the measurement optical signal of the sensor through a light window on the housing, then a photoelectric conversion is performed on the signal, and the signal is transmitted to an electrical module and an online calculation module outside the vacuum environment for an online calculation and calibration.

However, the use of the light window may not only reduce an intensity of the measurement optical signal, but may also cause distortion and crosstalk of the measurement optical signal, which may significantly influence the measurement accuracy.

SUMMARY

In view of the above, in order to solve the problem of signal distortion and crosstalk of the photoelectric detection device in the vacuum environment while avoiding interference and error codes in a signal transmission and improving an accuracy of the measurement optical signal, the present disclosure provides a photoelectric detection device with a sealed design and undistorted photoelectric signals as well as an implementation method to solve the above technical problem.

In order to achieve the objective described above, a photoelectric detection device with a sealed design and undistorted photoelectric signals is provided, comprising: a vacuum sealed housing, a photodetector array, a photoelectric conversion and synchronous acquisition circuit, and a high speed transmission circuit board, wherein the vacuum sealed housing comprises a mounting interface for mounting the photodetector array so as to form a sealed space; the photodetector array has a detection surface facing an outside of the vacuum sealed housing and configured to receive multi-channel measurement optical signals; the photoelectric conversion and synchronous acquisition circuit and the high speed transmission circuit board are placed in the vacuum sealed housing, and the photodetector array is connected to the photoelectric conversion and synchronous acquisition circuit through a signal pin of the photodetector array; and the photoelectric conversion and synchronous acquisition circuit is configured to synchronously convert the multi-channel measurement optical signals obtained by the photodetector array into multi-channel digital signals; and the high speed transmission circuit board is configured to perform a serial encoding processing on the converted multi-channel digital signals.

According to the embodiments of the present disclosure, the vacuum sealed housing comprises: an upper cover, a water cooling plate, a bottom shell, a heat conduction plate, an air inlet, an airflow baffle, a power supply and signal plug, an air outlet, a first sealing ring and a second sealing ring, wherein the upper cover is connected to the bottom shell and is sealed by the first sealing ring, the bottom shell and the photodetector array are sealed by the second sealing ring, and the second sealing ring and the first sealing ring jointly seal the vacuum sealed housing as a sealed cavity.

According to the embodiments of the present disclosure, the vacuum sealed housing is configured to provide a stable pressure and temperature environment for the photodetector array, the photoelectric conversion and synchronous acquisition circuit and the high speed transmission circuit board.

According to the embodiments of the present disclosure, the photodetector array comprises a photosensitive array, an insulating carrier, and a substrate, wherein the photosensitive array is made based on an N-type or P-type doped silicon wafer, a certain number of photosensitive units are distributed in the photosensitive array, and the photosensitive unit is configured to perform a photoelectric detection and conversion on the measurement optical signals; the insulating carrier is configured to separate a common cathode of the photosensitive array from the substrate; and a feedthrough pin and a mechanical mounting hole are provided on the substrate.

According to the embodiments of the present disclosure, a bonding pad and a protection electrode of the photosensitive unit are connected to the corresponding feedthrough pin on the substrate through a bonding wire.

According to the embodiments of the present disclosure, the photoelectric detection device further comprising: an online calculation module configured to perform a series of online calculations and calibrations on the obtained multi-channel digital signals, so as to obtain measurement signals of the photoelectric detection device.

In another aspect, a method implemented based on the photoelectric detection device described above is further provided, comprising: receiving multi-channel measurement optical signals from a photoelectric sensor by using a photodetector array; performing a photoelectric conversion on the multi-channel measurement optical signals by using a photoelectric conversion circuit, and converting the multi-channel measurement optical signals into multi-channel analog electrical signals; receiving a synchronization signal generated by an external calibration device by using a deserialization circuit module, and recording the synchronization signal generated by the external calibration device by using a programmable gate array main control module; activating a synchronous acquisition circuit by using the programmable gate array main control module according to the synchronization signal generated by the external calibration device, simultaneously converting the multi-channel analog electrical signals into multi-channel digital signals by using the acquisition circuit, and recording measurement values of the multi-channel digital signals by using the programmable gate array main control module; transmitting the measurement values of the multi-channel digital signals to a serialization circuit module by using the programmable gate array main control module according to the synchronization signal generated by the external calibration device, so as to achieve a conversion of parallel data to serial data; and transmitting the serial data in real time through a high speed transmission circuit board to an online calculation module to perform an online calculation and calibration.

According to the embodiments of the present disclosure, the photoelectric conversion circuit comprises a reverse voltage generator, a guard ring voltage generator, a transconductance amplifier, and a low-pass filter; and the reverse voltage generator is configured to generate a reverse voltage for the photodetector array, and the guard ring voltage generator is configured to generate a stable guard ring voltage, so as to reduce an interference of an external environment on the photodetector array.

According to the embodiments of the present disclosure, the FPGA main control module is further configured to monitor and acquire a temperature to compensate for the multi-channel measurement optical signals.

According to the embodiments of the present disclosure, the transmitting the serial data in real time through a high speed transmission circuit board to an online calculation module to perform an online calculation and calibration comprises: converting multi-channel measurement photoelectric signals of the photodetector array into multi-channel digital signals synchronously, and acquiring the multi-channel digital signals to the online calculation module; performing a dark current correction on each channel measurement signal, so as to obtain an original measurement signals with a nonlinear characteristic; correcting the original measurement signal with the nonlinear characteristic, so as to obtain a corrected linear measurement signal; and performing a zero offset correction on each channel linear measurement signal, each channel corrected linear measurement signal has a consistent zero point, so as to obtain a final measurement signal.

REFERENCE NUMERALS

Figure 1:
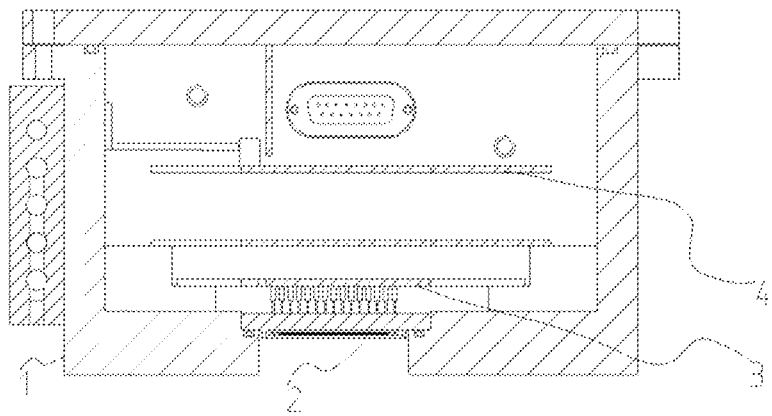
FIG. 1 schematically shows a structural diagram of a photoelectric detection device according to the embodiments of the present disclosure.

Vacuum sealed housing 1; photodetector array 2; photoelectric conversion and synchronous acquisition circuit 3; high speed transmission circuit board 4; upper cover 11; water cooling plate 12; bottom shell 13; heat conduction plate 14; air inlet 15; airflow baffle 16; power supply and signal plug 17; air outlet 18; first sealing ring 19; second sealing ring 110; photosensitive array 301; photosensitive unit 301-1; insulating carrier 302; conductive layer 302-1; vacuum adhesive 302-2; substrate 303; feedthrough pin 303-1; mechanical mounting hole 303-2.

DETAILED DESCRIPTION OF EMBODIMENTS

In order to make objectives, technical solutions and advantages of the present disclosure clearer, the present disclosure will be further described in detail below in combination with specific embodiments and with reference to the drawings.

FIG. 1 schematically shows a structural diagram of a photoelectric detection device according to the embodiments of the present disclosure. As shown in FIG. 1, a photoelectric detection device with a sealed design and undistorted photoelectric signals provided by the present disclosure includes a vacuum sealed housing 1, a photodetector array 2, a photoelectric conversion and synchronous acquisition circuit 3, and a high speed transmission circuit board 4.

According to the embodiments of the present disclosure, the vacuum sealed housing 1 includes a mounting interface for mounting the photodetector array 2, so as to form a sealed space; and the photodetector array 2 includes a detection surface facing an outside of the vacuum sealed housing 1 and is used to directly receive multi-channel measurement optical signals.

According to the embodiments of the present disclosure, the photoelectric conversion and synchronous acquisition circuit 3 and the high speed transmission circuit board 4 are placed in the vacuum sealed housing 1, and the photodetector array 2 is connected to the photoelectric conversion and synchronous acquisition circuit 3 through a signal pin of the photodetector array 2.

According to the embodiments of the present disclosure, the vacuum sealed housing 1 may carry the photodetector array 2, the photoelectric conversion and synchronous acquisition circuit 3 and the high speed transmission circuit board 4, and may provide a stable pressure and temperature environment for the photoelectric conversion and synchronous acquisition circuit and the high speed transmission circuit board, so as to ensure that the circuit board may operate stably under one standard atmospheric pressure and a normal temperature, and eliminate an interference of a temperature-rising change on a signal accuracy.

According to the embodiments of the present disclosure, the photoelectric conversion and synchronous acquisition circuit 3 is used to synchronously convert the multi-channel measurement optical signals obtained by the photodetector array 2 into multi-channel digital signals; and the high speed transmission circuit board 4 is used to perform a serial encoding processing on the converted multi-channel digital signals.

According to the embodiments of the present disclosure, by providing the photoelectric detection device with the sealed design and undistorted photoelectric signals, the detection surface of the photoelectric detector array with a vacuum compatibility is arranged to face the outside of the vacuum sealed housing, to directly receive the multi-channel measurement optical signals, so that the problem of signal distortion and crosstalk of the photoelectric detection device in the vacuum environment may be solved; after the photoelectric conversion is performed on the received multi-channel measurement optical signals by the photoelectric conversion and synchronous acquisition circuit, the serial encoding processing is performed on the converted multi-channel measurement optical signals by the high speed transmission circuit board, so that the interference and error codes of the signals during the transmission may be avoided, and the accuracy of the measurement signals may be improved.

Figure 2:
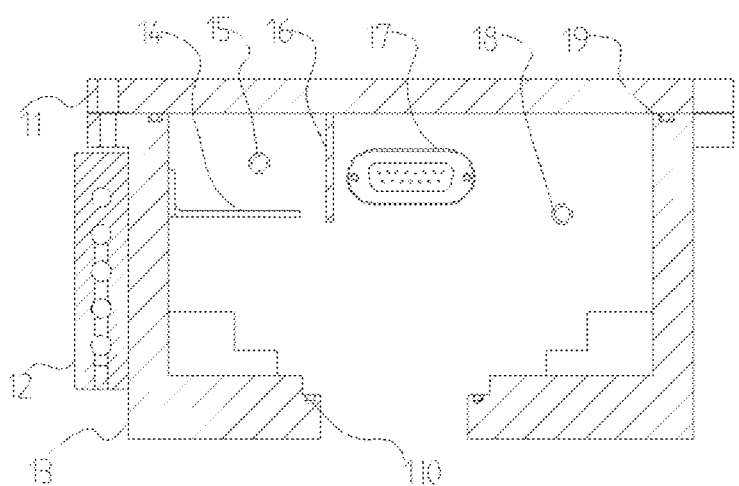
FIG. 2 schematically shows a structural diagram of a vacuum sealed housing in the photoelectric detection device according to the embodiments of the present disclosure.

FIG. 2 schematically shows a structural diagram of the vacuum sealed housing in the photoelectric detection device according to the embodiments of the present disclosure.

As shown in FIG. 2, the vacuum sealed housing includes an upper cover 11, a water cooling plate 12, a bottom shell 13, a heat conduction plate 14, an air inlet 15, an airflow baffle 16, a power supply and signal plug 17, an air outlet 18, a first sealing ring 19 and a second sealing ring 110.

According to the embodiments of the present disclosure, the upper cover 11 and the bottom shell 13 are connected by a fastener and sealed by the first sealing ring 19. The fastener may be a bolt. The water cooling plate 12 is separately arranged outside the bottom shell 13 and is connected to an outer side of the bottom shell 13. Heat may be transferred from the bottom shell 13 to the water cooling plate 12 by way of heat conduction, and then the heat is taken away by cooling water in the water cooling plate 12. The water cooling plate 12 may not be provided separately. Instead, a water channel may be designed and processed on the bottom shell 13 to meet requirements for water cooling and heat dissipation.

According to the embodiments of the present disclosure, the heat conduction plate 14 is in contact with a heat source of the high speed transmission circuit board 4, and is tightly connected to the bottom shell 13 through the fastener, so that the heat of the high speed transmission circuit board 4 may be effectively conducted to the bottom shell 13.

According to the embodiments of the present disclosure, the air inlet 15 and the air outlet 18 may be respectively an air inlet joint and an air outlet joint welded to the bottom shell 13, and the welding needs to meet a requirement for vacuum sealing. A gas such as nitrogen or a clean air may be introduced into the vacuum sealed housing 1 through the air inlet 15; heat may be conducted away after a heat exchange between an airflow entering the vacuum sealed housing 1 through the air inlet 15 and a heat dissipation component together with a heat source of the high speed transmission circuit board 4 and then taken away by the air outlet 18. The airflow entering the vacuum sealed housing 1 may further transfer the heat to the bottom shell through a convective heat exchange with the bottom shell 13.

According to the embodiments of the present disclosure, the airflow baffle 16 may be connected to the upper cover 11 by means of fastener or welding, so as to achieve an airflow guidance and an effective heat exchange and cooling of a specific heating area, which may include providing a guidance for the airflow entering the vacuum sealed housing 1 from the air inlet 15, so that the airflow entering the vacuum sealed housing 1 flows to a main heat dissipation component or the heat source of the high speed transmission circuit board 4. The power supply and signal plug 17 may be connected to the bottom shell 13 by means of welding, and the welding needs to meet the requirement for vacuum sealing.

According to the embodiments of the present disclosure, the second sealing ring 110 is used to perform a sealing between the bottom shell 13 and the photodetector array 2, and the second sealing ring 110 and the first sealing ring 19 jointly seal the vacuum sealed housing 1 as a sealed cavity. The vacuum sealing may be achieved by a variety of manners such as metal sealing or rubber sealing, etc.

According to the embodiments of the present disclosure, by sealing the bottom shell of the vacuum sealed housing and the photodetector array so as to form the sealed cavity, a stable pressure and temperature environment may be provided for the photoelectric conversion, the synchronous acquisition and the high speed transmission circuit so as to ensure that the circuit board may operate stably under one standard atmospheric pressure and a normal temperature, and an interference of a temperature-rising change on a signal accuracy may be eliminated. Meanwhile, various devices in the photodetector device carried by the vacuum sealed housing may be prevented from releasing gases and particles in the vacuum environment to cause a contamination to the vacuum environment.

Figure 3:
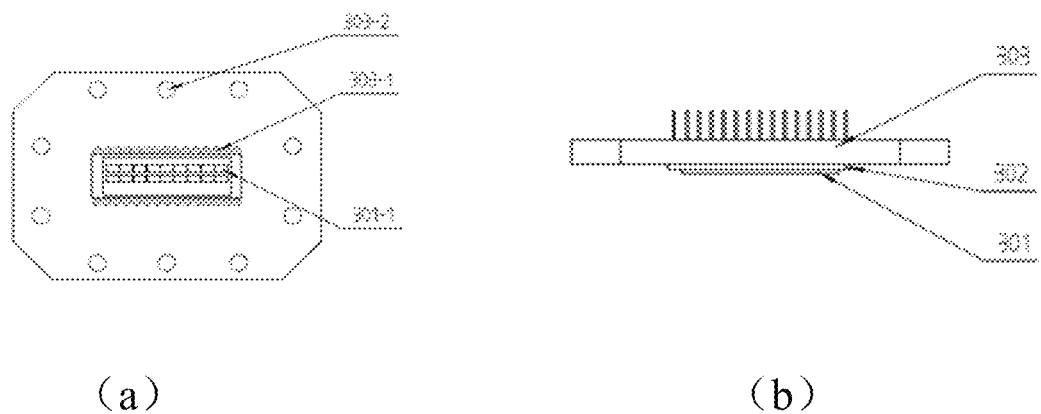
FIG. 3 and FIG. 4 schematically show a structural diagram of a photoelectric detector array in the photoelectric detection device according to the embodiments of the present disclosure.
Figure 4:
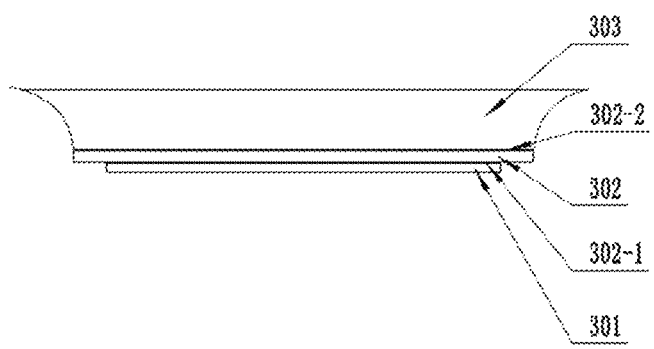

FIG. 3 and FIG. 4 schematically show a structural diagram of a photoelectric detector array in the photoelectric detector device according to the embodiments of the present disclosure.

As shown FIG. 3(b), the photodetector array 2 includes a photosensitive array 301, an insulating carrier 302, and a substrate 303.

According to the embodiments of the present disclosure, the photosensitive array 301 is made based on an N-type or P-type doped silicon wafer substrate. A detection surface of the photodetector array 2 faces an outside of the vacuum sealed housing 1, and the detection surface here is the photosensitive array 301. As shown in FIG. 3(a), a certain number of photosensitive units (301-1) are distributed in the photosensitive array 301, so as to perform a photodetection and conversion on the multi-channel measurement optical signals.

As shown in FIG. 4, a conductive layer 302-1 is provided on the insulating carrier 302, and the conductive layer 302-1 on the insulating carrier 302 is connected or bonded to a common cathode of the photosensitive array 301. The conductive layer 302-1 may be a thin layer of a highly conductive adhesive, such as an epoxy conductive silver adhesive. A vacuum adhesive 302-2 is further provided on the insulating carrier 302, and the insulating carrier 302 is pasted with the substrate 303 through the vacuum adhesive 302-2.

According to the embodiments of the present disclosure, the insulating carrier 302 is used to separate the common cathode of the photosensitive array 301-1 from the substrate 303.

In combination with FIGS. 3(*a*) and 3(*b*), a feedthrough pin 303-1 and a mechanical mounting hole 303-2 is provided on the substrate 303.

According to the embodiments of the present disclosure, a bonding pad and a protection electrode of the photosensitive unit 301-1 are both connected to the corresponding feedthrough pin 303-1 on the substrate 303 through a bonding wire. The mechanical mounting hole 303-2 includes a through hole and a pin hole to support a precise assembly with a subsequent processing module.

According to the embodiments of the present disclosure, the photoelectric detection device provided by the present disclosure may further include an online calculation module, which is placed outside the vacuum environment and implemented in a form of an embedded board or a computer.

According to the embodiments of the present disclosure, the online calculation module mainly functions to perform a series of real-time online calculation and calibration processing on the acquired multi-channel digital signals, so as to obtain final multi-channel measurement signals of the photoelectric detection device.

Figure 5:
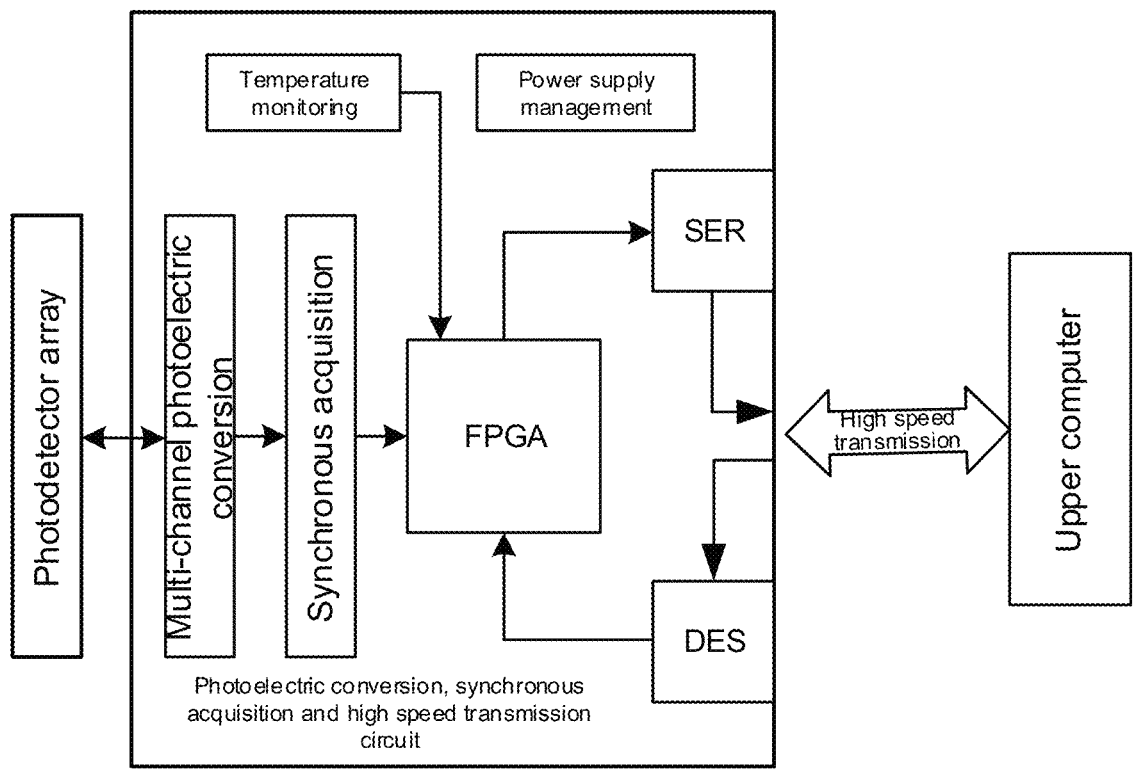
FIG. 5 schematically shows a block circuit diagram of an implementation method based on the photoelectric detection device according to the embodiments of the present disclosure.
Figure 6:
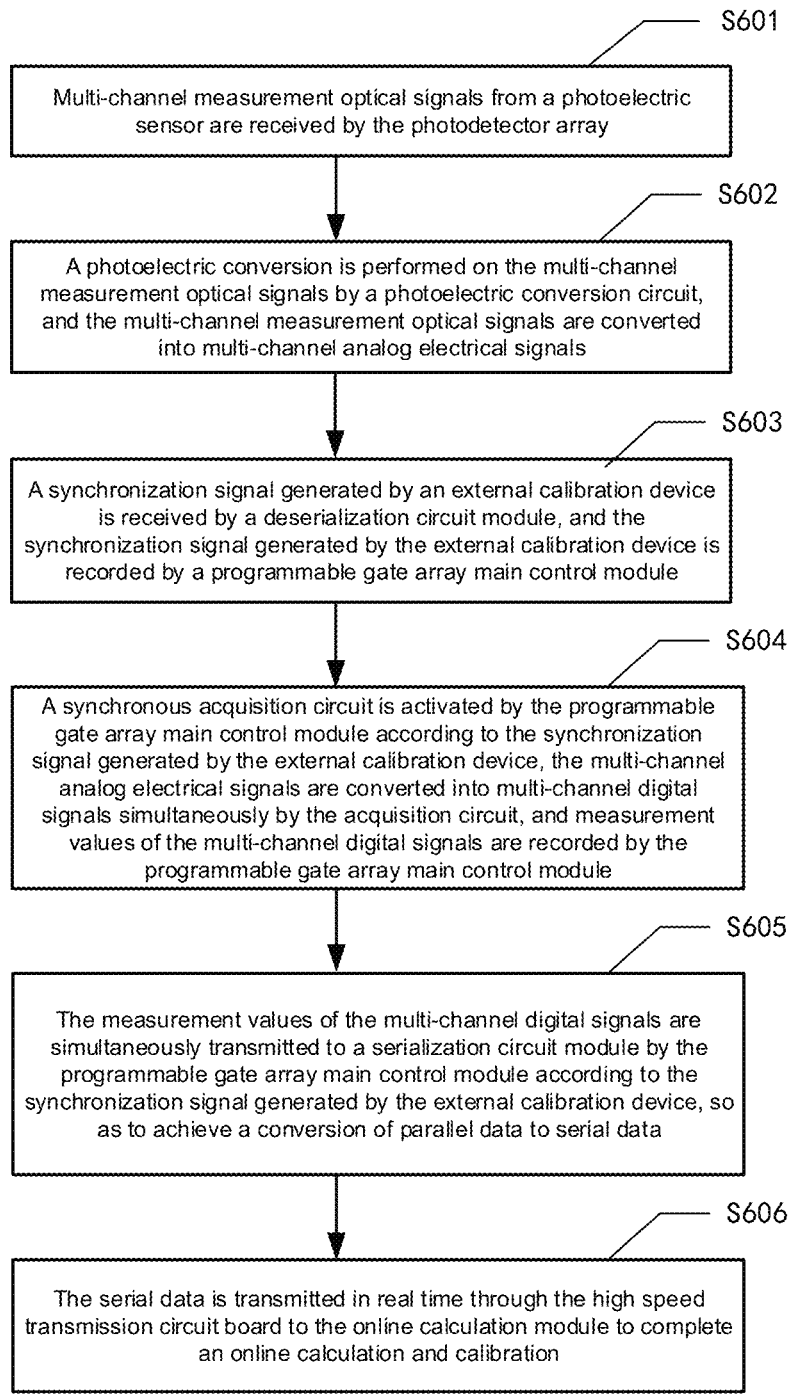
FIG. 6 schematically shows a flowchart of an implementation method based on the photoelectric detection device according to the embodiments of the present disclosure.

FIG. 5 schematically shows a block circuit diagram of an implementation method based on the photoelectric detector device according to the embodiments of the present disclosure. FIG. 6 schematically shows a flowchart of the implementation method based on the photoelectric detector device according to the embodiments of the present disclosure.

In the embodiments of the present disclosure, the implementation method based on the photodetector array may be used to perform a signal processing on the received measurement signal.

In combination with FIG. 5 and FIG. 6, the implementation method based on the photoelectric detection device includes operations S601 to S606.

In operation S601, multi-channel measurement optical signals from a photoelectric sensor are received by the photodetector array.

According to the embodiments of the present disclosure, the photosensitive array in the photodetector array faces the outside of the vacuum sealed housing, and is used to receive the multi-channel measurement optical signals emitted by the sensor. A current output by the photodetector array may increase with an increase of a received optical intensity.

In operation S602, a photoelectric conversion is performed on the multi-channel measurement optical signals by a photoelectric conversion circuit, and the multi-channel measurement optical signals are converted into multi-channel analog electrical signals.

According to the embodiments of the present disclosure, the photoelectric conversion circuit includes a reverse voltage generator, a guard ring voltage generator, a transconductance amplifier, and a low-pass filter. The reverse voltage generator may generate a reverse voltage for the photodetector array, and the guard ring voltage generator may generate a stable guard ring voltage, so as to reduce an interference of an external environment on the photodetector array.

According to the embodiments of the present disclosure, the transconductance amplifier may perform a transconductance amplification on the current signal output by the photodetector array, that is, convert the current signal into a voltage signal. In other words, a photoelectric conversion is performed on the received multi-channel measurement optical signals, and the multi-channel measurement optical signals are converted into the analog electrical signals.

In operation S603, a synchronization signal generated by an external calibration device is received by a deserialization circuit module, and the synchronization signal generated by the external calibration device is recorded by a programmable gate array main control module.

According to the embodiments of the present disclosure, a synchronization signal receiving circuit may include an SAM radio frequency coaxial interface and a high speed optocoupler, which are used to receive the synchronization signal from the external calibration device. The synchronization signal may be used as a clock signal to simultaneously acquire the multi-channel measurement analog electrical signals after the photoelectric conversion is performed on the photoelectric detection device of the present disclosure.

According to the embodiments of the present disclosure, the DES deserialization circuit module may transmit the acquired synchronization signal of the external calibration device to a FPGA module to record the synchronization signal of the external calibration device.

In operation S604, a synchronous acquisition circuit is activated by the programmable gate array main control module according to the synchronization signal generated by the external calibration device, the multi-channel analog electrical signals are converted into multi-channel digital signals simultaneously by the synchronous acquisition circuit, and measurement values of the multi-channel digital signals are recorded by the programmable gate array main control module.

According to the embodiments of the present disclosure, in the step S603 described above, after the DES deserialization circuit module acquires the synchronization signal of the external calibration device, the synchronization signal is used as the clock signal, the synchronous acquisition circuit is activated by the FPGA main control module, so as to obtain the multi-channel measurement analog electrical signals after the photoelectric conversion is performed on the photoelectric detection device in the present disclosure and perform the synchronization acquisition simultaneously, and the converted analog electrical signals are simultaneously converted into multi-channel digital signals through the synchronous acquisition circuit, and a real-time measurement value is recorded.

In operation S605, the measurement values of the multi-channel digital signals are simultaneously transmitted to a serialization circuit module by the programmable gate array main control module according to the synchronization signal generated by the external calibration device, so as to achieve a conversion of parallel data to serial data.

According to the embodiments of the present disclosure, the SER may convert the parallel data of the synchronization signal generated by the external calibration device and the measurement value of the multi-channel digital signals into LVDS serial data, so as to achieve a conversion to serial data, and perform a serial encoding processing.

In operation S606, the serial data is transmitted in real time through the high speed transmission circuit board to the online calculation module to complete an online calculation and calibration.

According to the embodiments of the present disclosure, the LVDS serial data converted from the real-time measurement values from the external calibration device and the photoelectric detection device of the present disclosure may be simultaneously transmitted to the high speed transmission circuit, and the high speed transmission circuit may transmit the data in real time to the online calculation module for analysis and processing.

According to the embodiments of the present disclosure, the FPGA main control module may further monitor and acquire a temperature to compensate for the multi-channel measurement optical signals.

Through the embodiments of the present disclosure, according to the implementation method based on the photoelectric detection device, the multi-channel measurement optical signals may be simultaneously acquired through the synchronous acquisition circuit, and the data corresponding to the photoelectric detection device of the present disclosure may be acquired by using the synchronization signal as the clock signal, the synchronization signal is generated by the external calibration device and received by the DES deserialization circuit module, so that a measurement accuracy may be achieved. Furthermore, through the implementation method, after the photoelectric conversion is performed on the received multi-channel measurement photoelectric signals, a serial encoding processing is performed on the data of the multi-channel measurement optical signals, so that a signal distortion problem caused by the interference and error codes in the transmission process may be solved, and the number of transmission cables may be reduced.

Figure 7:
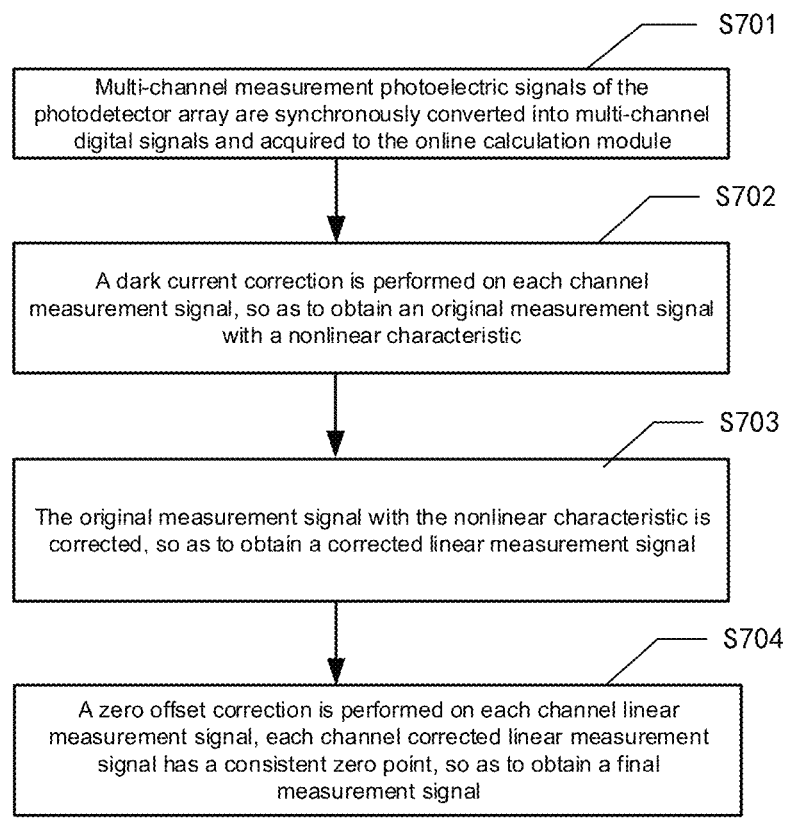
FIG. 7 schematically shows a schematic diagram of an online calibration process of a measurement signal according to the embodiments of the present disclosure.

FIG. 7 schematically shows a schematic diagram of an online calibration process of measurement signal according to the embodiments of the present disclosure.

As shown in FIG. 7, a process of transmitting the serial data in real time through the high speed transmission circuit board to the online calculation module to perform the online calculation and calibration includes operation S701 to S704.

In operation S701, multi-channel measurement photoelectric signals of the photodetector array are converted into multi-channel digital signals, and acquired to the online calculation module.

According to the embodiments of the present disclosure, the acquiring multi-channel measurement photoelectric signals, converting the multi-channel measurement photoelectric signals into multi-channel digital signals and transmitting the multi-channel digital signals to the online calculation module in this operation have been described in detail in the operation S601 to S606 described above, which will not be repeated here.

In operation S702, a dark current correction is performed on each channel measurement signal, so as to obtain an original measurement signal with a nonlinear characteristic.

According to the embodiments of the present disclosure, a dark current may be removed from each channel measurement signal by way of online calibration, and the original measurement signal may be calculated through differential and normalization processing on the corrected measurement signal after a removal of the dark current.

Figure 8:
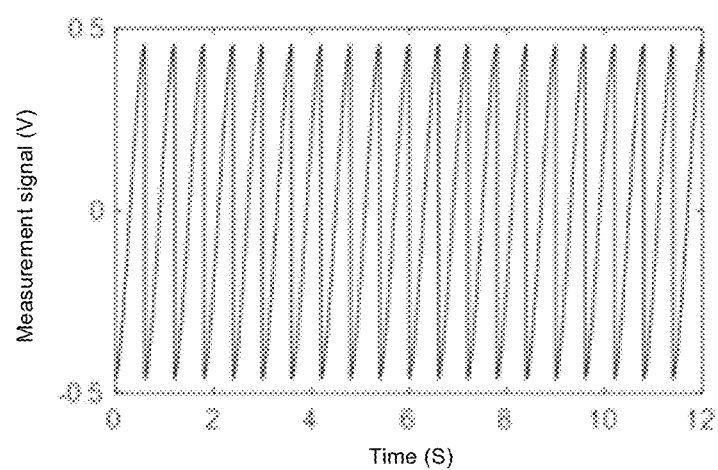
FIG. 8 schematically shows a schematic diagram of an original measurement signal with a nonlinear characteristic according to the embodiments of the present disclosure.

For example, FIG. 8 schematically shows a schematic diagram of the original measurement signal with a nonlinear characteristic according to the embodiments of the present disclosure.

A signal diagram of the original measurement signal before a linear correction is performed is shown in FIG. 8. It can be seen from the drawing that the uncorrected original measurement signal has obvious nonlinear characteristics near edges of a measurement range.

In operation S703, the original measurement signal with the nonlinear characteristic is corrected, so as to obtain a corrected linear measurement signal.

According to the embodiments of the present disclosure, a polynomial fitting method may be used to perform the linear correction on the original measurement signals so as to obtain the linear measurement signals.

In operation S704, a zero offset correction is performed on each channel linear measurement signal, each channel corrected linear measurement signal has a consistent zero point, so as to obtain a final measurement signal.

According to the embodiments of the present disclosure, in the linear measurement signals obtained in operation S703, the zero point of each channel measurement signal is not equal. An online correction may be performed on the zero point of each channel measurement signal through a reference signal of the external calibration device, so that the zero point of each channel measurement signal obtained by the detector device of the present disclosure is consistent, so as to obtain the corrected final measurement signals.

According to the embodiments of the present disclosure, by providing the photoelectric detection device with the sealed design and undistorted photoelectric signals and the implementation method, the detection surface of the photoelectric detector array with a vacuum compatibility is arranged to face the outside of the sealed housing so as to directly receive the multi-channel measurement optical signals, then the circuit board inside the sealed housing performs a photoelectric conversion on the received multi-channel measurement optical signals, and a serial encoding processing is performed on the multi-channel measurement optical signal data, so that the problem of distortion and crosstalk of the signal caused by interference and error codes during the transmission may be solved, and the number of transmission cables may be reduced.

The above specific embodiments have described in detail the objective, technical solution and advantages of the present disclosure. It should be noted that the above are only specific embodiments of the present disclosure and are not intended to limit the present disclosure. Any modification, equivalent substitution, improvement, etc., made within the spirit and scope of the present disclosure shall be included within the protection scope of the present disclosure.

What is claimed is:

1. A photoelectric detection device with a sealed design and undistorted photoelectric signals, comprising: a vacuum sealed housing, a photodetector array, a photoelectric conversion and synchronous acquisition circuit, and a high speed transmission circuit board, wherein
    the vacuum sealed housing comprises a mounting interface for mounting the photodetector array so as to form a sealed space;
    the photodetector array has a detection surface facing an outside of the vacuum sealed housing and configured to receive multi-channel measurement optical signals;
    the photoelectric conversion and synchronous acquisition circuit and the high speed transmission circuit board are placed in the vacuum sealed housing, and the photodetector array is connected to the photoelectric conversion and synchronous acquisition circuit through a signal pin of the photodetector array; and
    the photoelectric conversion and synchronous acquisition circuit is configured to synchronously convert the multi-channel measurement optical signals obtained by the photodetector array into multi-channel digital signals; and the high speed transmission circuit board is configured to perform a serial encoding processing on the converted multi-channel digital signals.

2. The photoelectric detection device of claim 1, wherein the vacuum sealed housing comprises:
    an upper cover, a water cooling plate, a bottom shell, a heat conduction plate, an air inlet, an airflow baffle, a power supply and signal plug, an air outlet, a first sealing ring and a second sealing ring, wherein the upper cover is connected to the bottom shell and is sealed by the first sealing ring, the bottom shell and the photodetector array are sealed by the second sealing ring, and the second sealing ring and the first sealing ring jointly seal the vacuum sealed housing as a sealed cavity.

3. The photoelectric detection device of claim 1, wherein the vacuum sealed housing is configured to provide a stable pressure and temperature environment for the photodetector array, the photoelectric conversion and synchronous acquisition circuit and the high speed transmission circuit board.

4. The photoelectric detection device of claim 1, wherein the photodetector array comprises a photosensitive array, an insulating carrier, and a substrate, wherein the photosensitive array is made based on an N-type or P-type doped silicon wafer, a certain number of photosensitive units are distributed in the photosensitive array, and the photosensitive unit is configured to perform a photoelectric detection and conversion on the measurement optical signals;

the insulating carrier is configured to separate a common cathode of the photosensitive array from the substrate; and a feedthrough pin and a mechanical mounting hole are provided on the substrate.

5. The photoelectric detection device of claim 4, wherein a bonding pad and a protection electrode of the photosensitive unit are connected to the corresponding feedthrough pin on the substrate through a bonding wire.

6. The photoelectric detection device of claim 1, further comprising: an online calculation module configured to perform a series of online calculations and calibrations on the obtained multi-channel digital signals, so as to obtain measurement signals of the photoelectric detection device.

* * * * *